United States Patent [19]

Salmen et al.

[11] 4,115,801
[45] Sep. 19, 1978

[54] OPTICAL IMAGE CORRELATOR TRACKING FILTER CIRCUIT

[75] Inventors: Richard A. Salmen, Youngstown; Clark G. Reed, Greentown, both of Ohio

[73] Assignee: Goodyear Aerospace Corporation, Akron, Ohio

[21] Appl. No.: 773,998

[22] Filed: Mar. 3, 1977

[51] Int. Cl.$^2$ .............................................. H04N 7/18
[52] U.S. Cl. ...................................... 358/93; 364/515
[58] Field of Search ............... 358/93, 105; 315/10; 364/515

[56] References Cited

U.S. PATENT DOCUMENTS 3,662,104 5/1972 Nordseth et al. ...................... 358/93
3,823,261 7/1974 Bolsey ................................... 358/105

*Primary Examiner*—Nelson Moskowitz
*Assistant Examiner*—T. M. Blum
*Attorney, Agent, or Firm*—P. E. Milliken; E. W. Oldham; R. L. Weber

[57] ABSTRACT

A tracking filter circuit for use with optical image correlators is presented. The output signal of the optical image correlator exhibits a frequency content shift during operation due to the application of a ramp voltage to the nutation control circuitry of the correlator. The filter circuit is controlled by the ramp voltage such that the frequency response of the filter tracks the frequency content shift of the output signal. Integrator and multiplier circuits are interconnected as a part of a feedback network to accomplish the filtering technique.

6 Claims, 3 Drawing Figures

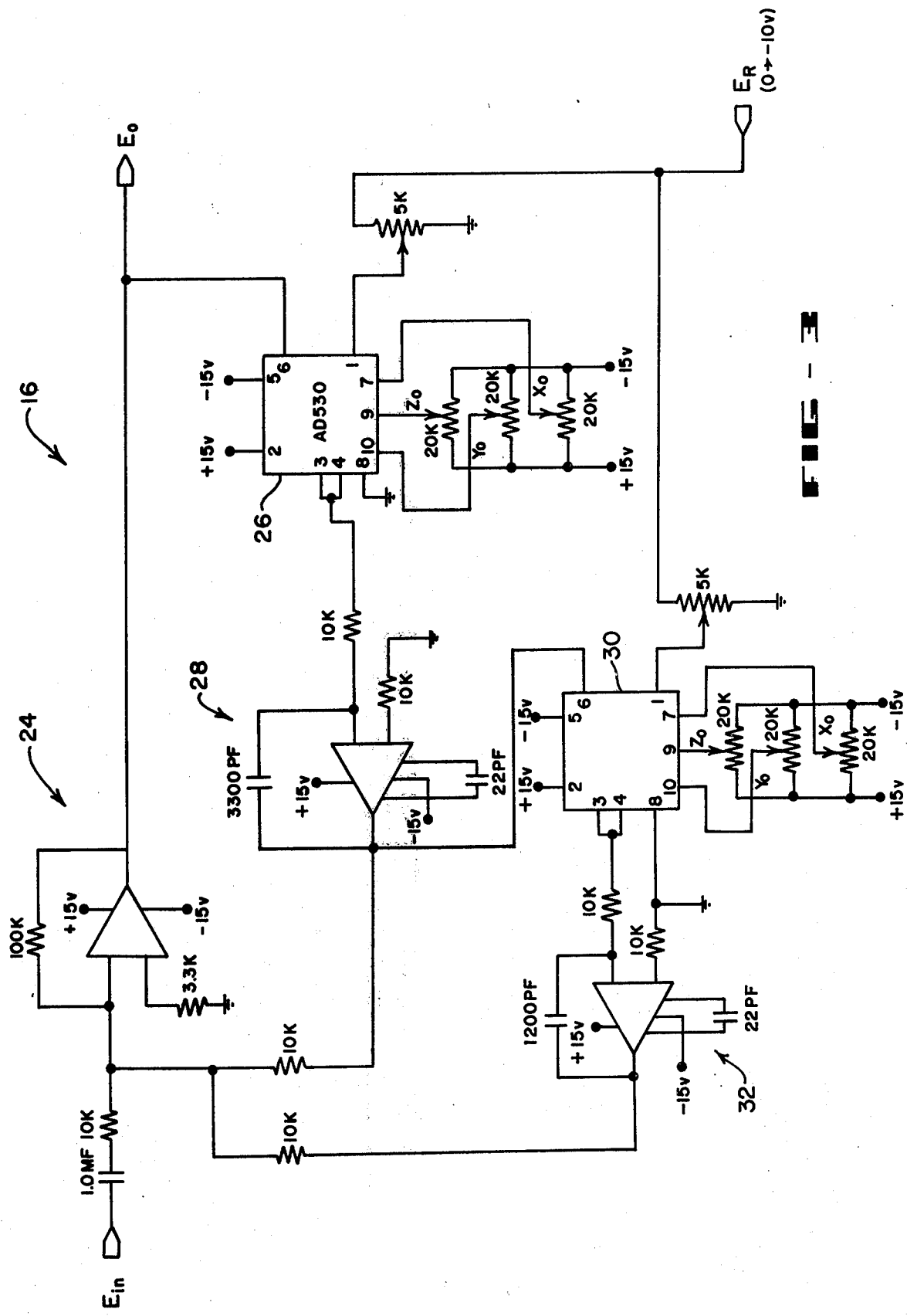

OPTICAL IMAGE CORRELATOR TRACKING FILTER CIRCUIT

BACKGROUND OF THE INVENTION

This invention deals in the art of optical image correlators and more particularly with an improvement therein respecting the filtering of the output correlation signal. Heretofore, numerous types of optical image correlators have been known in the art and the invention herein deals particularly with such correlators as those shown generally in U.S. Pat. No. 3,496,290, to R. H. Smith; No. 3,564,126, to Richard F. Koch; No. 3,424,937, to W. L. Steiner; and No. 3,423,624, to W. L. Stiner. These prior art patents have been assigned to Goodyear Aerospace Corporation of Akron, Ohio, the assignee of the invention presented herein.

While optical image correlators may be of numerous types, the general structure of such correlators includes a photo emissive cathode upon which an optical input signal is cast. Electrons are emitted from the cathode and directed, under control of deflection coils, to a storage grid which maintains an electrical charge indicative of a reference image. Of course, a collector grid may be interposed between the storage grid and the photo cathode for control of secondary emission. The output signal of the optical image correlator is directly related to the degree of optical correlation existing between the optical input signal and the reference optical image maintained upon the storage grid. The deflection of the electron stream passing from the photo cathode to the storage grid causes the input optical signal or image to be nutated upon the stored optical image with a maximum output signal being evidenced from the correlator when the input image and stored image are in registration with each other.

With reference now to FIG. 1, it can be seen that an optical image correlation system is designated generally by the numeral 10 and is shown as including an optical image correlator 12 of the nature discussed hereinabove and more particularly as set forth in any of the aforementioned prior art patents. As shown in FIG. 1, and as set forth in the referenced prior art, the output of the optical image correlator 12, which is indicative of the degree of correlation existing between the optical input image signal and a stored optical image, is passed to the circuitry 14 containing preamps and noise cancellation circuitry. The output of the circuit 14 is passed to a filter 16 which emits a filtered correlation signal indicative of the correlation function performed by the optical image correlator 12. As discussed earlier, the correlation function is performed at 12 by means of controlling deflection coils maintained therein and interposed between the photo cathode and storage grid. The electrons passing across the deflection coils, as known in the art, are nutated to effectuate the correlation technique. This nutation is controlled by means of the deflection coils control circuitry 22 which feeds its output signal to the deflection coils; such signal being a function of the correlation signal and a variable amplitude sinusoidal signal controlled by a ramp generator 18 which produces a ramp function output signal. As the output of the generator 18 linearly changes its amplitude, the corresponding amplitude of the sinusoidal output signal of the circuit 20 changes and correspondingly the deflection of the electron stream is controlled by the deflection coils control circuitry 22.

In utilizing the system shown in FIG. 1, it has been found that as the ramp generator 18 causes the circuits 20, 22 to affectuate a nutation cycle of the deflection coils of the correlator 12, the output signal of the correlator 12 changes in frequency with respect to the information content thereof. This is readily appreciated in that the varying amplitude nutation signal applied to the coils via the circuit 22 results in a varying degree of movement of the electron stream (representing the optical image input signal) with respect to the fixed image maintained upon the storage grid. This change in relative motion between the input image and the stored image results in a frequency content shift of the correlation signal emitted from the correlator 12 during the nutation cycle.

In order to circumvent the aforementioned problems inherent with velocity variations of the electron stream and the frequency content shift of the correlation signal, filtering circuits have been devised for receiving and filtering the correlation signal. The known filters generally function as a multiple step search filter with each step providing a constant filter corner for a portion of the nutation signal. Such filters require sequential switching to the appropriate filter section at particular points along the ramp function output of the generator 18. Of course, each section of the filter has a frequency response characteristic uniquely adapted to its related portion of the ramp function. However, to achieve optimum filtering, an infinite number of sections of the filter would be necessary so that the filter can congruently trace the ramp function rather than in a stepping fashion. Indeed, utilizing the sectioned-filter approach, a trade-off must be made between filter circuit complexity and output signal integrity. Further, it has been found that multiple step search filters inherently create noise problems within the system due to the transients which occur upon switching to each step.

Consequently, it is an object of the instant invention to provide an optical image correlator tracking filter circuit wherein the frequency response of the filter traces the ramp function controlling the coil nutation.

Yet another object of the invention is to present an optical image correlator tracking filter circuit wherein the inherent trade-offs necessary when using sectioned filters may be alleviated.

A further object of the invention is to present an optical image correlator tracking filter circuit wherein the noise generation problems of prior art filters are non-existent.

Still another object of the invention is to present an optical image correlator tracking filter circuit which is reliable in operation, simplistic in design, and readily conducive to implementation with presently existing optical image correlators and utilizing state-of-the-art elements.

These objects and other objects which will become apparent as the detailed description proceeds are achieved by an optical image correlator circuit, comprising: an optical image correlator receiving an optical image input signal, converting said input signal to an electron stream and nutating said stream as it approaches a storage grid upon which a reference image is maintained as a distributed charge, said correlator producing an output signal indicative of the correlation between the input signal and the reference image; deflection coils interposed within said correlator for nutating said electron stream; a deflection coil control circuit interconnected with and controlling said deflection coils for linearly regulating the rate of nutation of said electron stream; a filter circuit interconnected between said correlator and said deflection coil control circuit for receiving and filtering the output signal of the correlator, said filter circuit having a characteristic frequency response which linearly varies with, and is under control of, an output of said deflection coil control circuit.

DESCRIPTION OF THE DRAWINGS

For an appreciation of the objects, techniques and structure of the invention, reference should be had to the following detailed description and accompanying drawings wherein:

FIG. 3 is a detailed circuit schematic of the filter circuit constructed according to the block diagram of FIG. 2.

DETAILED DESCRIPTION OF PREFERRED EMBODIMENT

As discussed hereinabove with respect to FIG. 1, the filter 16 of the invention is designed such that the input signal thereto, $E_{in}$, is the correlation signal emitted from the correlator 12 and passed through the circuit 14. The output signal, $E_O$, from the filter 16 is indeed the filtered correlation signal while the other input to the filter 16 from the ramp generator 18 is the ramp voltage itself, $E_R$. With this in mind, it has been found that the Laplace transfer function of the filter 16 is to be as follows:

$$\frac{E_O}{E_{in}}(S) = \frac{-K_1 S^2}{(S + W_1)^2}$$

wherein $w_1$ is the lower frequency break point determined by the Bode plot with respect to the frequency content of the correlation signal and wherein $K_1$ is a scaling constant. It is, of course, most desirable that $w_1$ be a linear function of the ramp voltage, $E_R$, such that $w_1 = K_R E_R$ wherein $K_R$ is a proportionality constant. In this case, the transfer function becomes:

$$\frac{E_O}{E_{in}} = \frac{-K_1 S^2}{(S + K_R E_R)^2}$$

such that:

$$\frac{-E_O}{K_1} = E_{in} + \frac{2K_R E_R E_O}{K_1 S} + \frac{K_R^2 E_R^2 E_O}{K_1 S^2}$$

Figure 2:
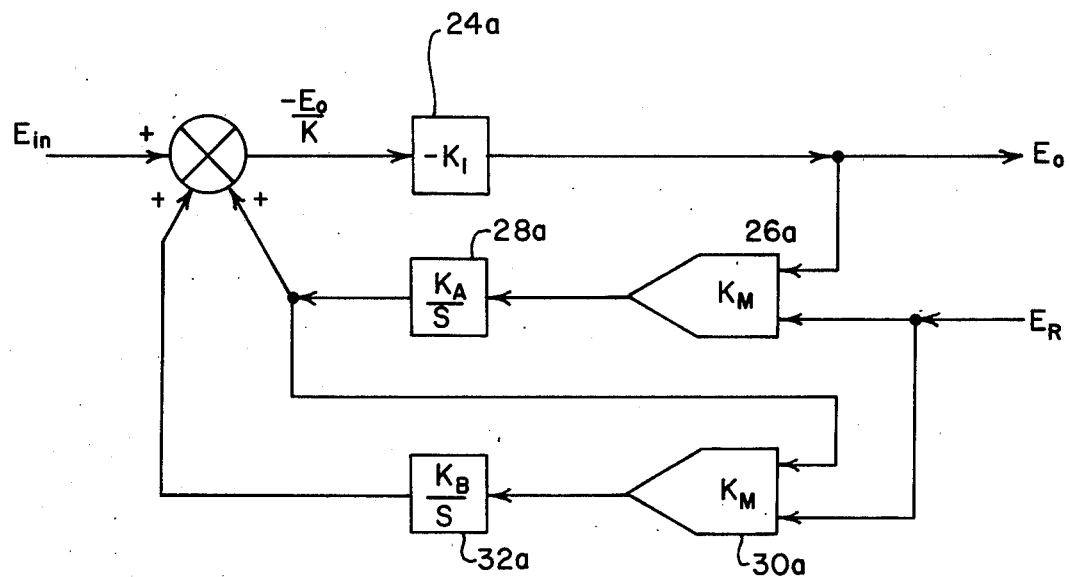
FIG. 2 is a block diagram of the Laplacian circuit comprising the filter of the invention.

Using ordinary Laplacian techniques this last equation may be implemented into the block diagram shown in FIG. 2. As can be seen, new constants $K_A$ and $K_B$ are incorporated in this circuit along with the multiplier gain $K_M$ which constants replace the constant $K_R$ in the immediately prior equation.

With reference now to FIG. 3, it can be seen that the circuit schematic of FIG. 2 may be reduced to a discrete component circuit utilizing ordinary techniques. Particularly, as can be seen from the filter circuit designated generally by the numeral 16 in FIG. 3, the input voltage, $E_{in}$, is applied to a summing point amplifier 24 corresponding to the summing point amplifier 24a of the Laplacian circuit of FIG. 2. Of course, other inputs are applied to the summing point amplifier 24 as will become apparent hereinafter. As is further apparent from the circuitry of FIG. 2, the output, $E_O$, of the summing point amplifier 24a is fed back to a multiplier 26a which also receives as an input thereto the ramp voltage $E_R$. The multiplier 26a is characterized by a multiplier gain $K_M$. In the discrete circuit of the invention, the multiplier 26 performs the function of the multiplier 26a and, as seen, receives as inputs thereto the output voltage $E_O$ and the ramp voltage $E_R$.

An integrator 28a is shown in FIG. 2 as receiving the output of the multiplier 26a and corresponds with the integrator 28 of the circuitry of FIG. 3; the output thereof being passed as an input to the summing point amplifier 24. As can again be seen from FIG. 2, the output of the integrator 28a is passed as an input to the multiplier 30a which also receives, as an input thereto, the ramp voltage $E_R$. This multiplier is shown in FIG. 3 under designation of the numeral 30 with the output thereof passing to the integrator circuit 32 corresponding to the integrator 32a of FIG. 2. Again, the output of the integrator 32a passes to the summing point amplifier 24a as does the output of the integrator 32 in passing to the summing point amplifier 24.

Figure 1:
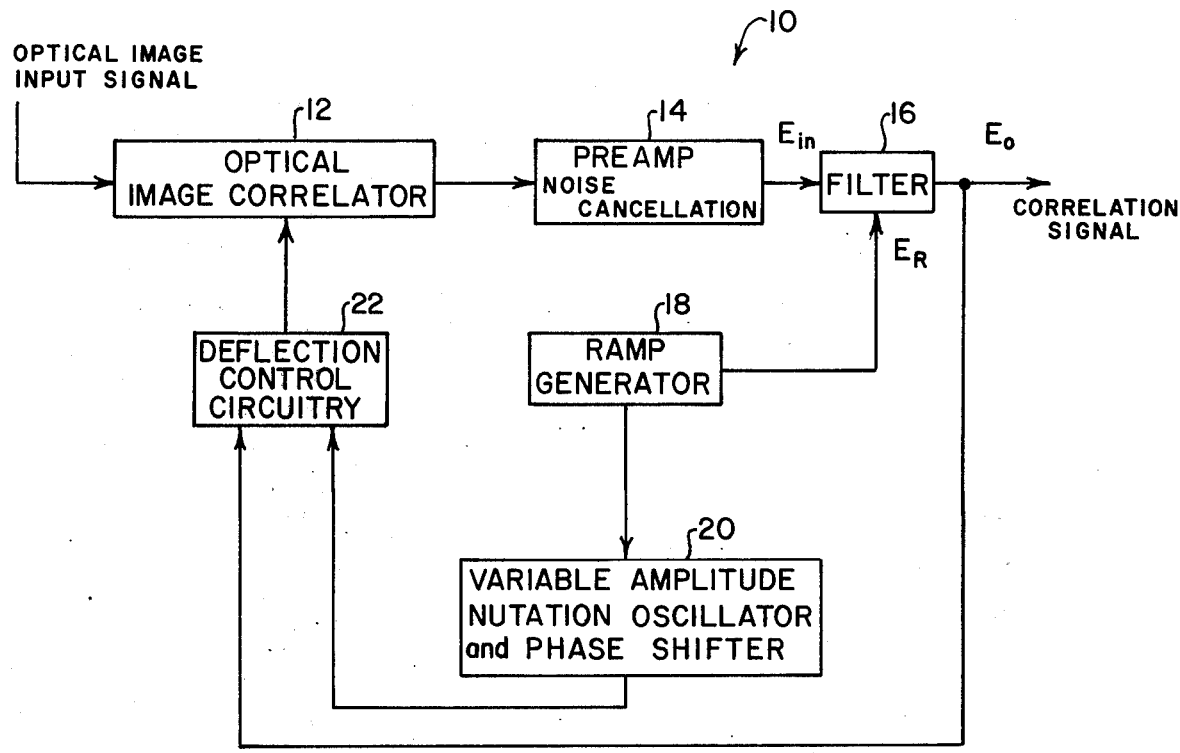
FIG. 1 is a functional block diagram of an optical image correlator system and showing the positioning therein of the filter circuit.

By utilizing the specific circuit values shown in FIG. 3, it has been found that a tracking filter 16 may be developed for utilization in an optical image correlator system 10 as shown in FIG. 1 wherein the maximum absolute value of the ramp voltage $E_R$ is 10 volts, the maximum value of the frequency $w_1$ is $50\pi \times 10^3$ radians/second, and wherein as the absolute value of the ramp voltage linearly decreases to one volt, the value of the frequency $w_1$ continuously decreases to $5\pi \times 10^3$ radians/second, thereby tracking the decreasing frequency content of the output signal of the correlator 12. Of course, depending upon the particular optical image correlator with which the filter is to function, the specific circuit values of the filter elements will vary.

Consequently, the tracking filter circuit has provided, using a simplistic design and state-of-the-art elements, a frequency response which traces the ramp function controlling the coil nutation, and at the same time has alleviated the design trade-offs necessary when using a sectioned filter, and eliminated the noise generation problems of prior art filters.

Thus it can be seen that the objects of the invention have been achieved with the structure and techniques presented hereinabove. While in accordance with the patent statutes only the best mode and preferred embodiment of the invention has been presented and described in detail, it is to be understood that the invention is neither limited thereto nor thereby. Consequently, for an appreciation of the true scope and breadth of the invention reference should be had to the appended claims.

What is claimed is:

1. An optical image correlator circuit, comprising:
  an optical image correlator receiving an optical image input signal, converting said input signal to an electron stream and nutating said stream as it approaches a storage grid upon which a reference image is maintained as a distributed charge, said correlator producing an output signal indicative of the correlation between the input signal and the reference image;

deflection coils interposed within said correlator for nutating said electron stream;

a deflection coil control circuit means interconnected with and controlling said deflection coils for linearly regulating the rate of nutation of said electron stream, said deflection coil control circuit means including a ramp generator; and a filter circuit interconnected between said correlator and said deflection coil control circuit for receiving and filtering the output signal of the correlator, said filter circuit having a characteristic frequency response which linearly varies with, and is under control of, an output of said deflection coil control circuit and includes a first multiplier circuit receiving an output from said ramp generator, a first integrator connected to and receiving an output from said multiplier, and a summing point amplifier connected to said first integrator and said correlator and receiving output signals therefrom.

2. The optical image correlator circuit as recited in claim 1 wherein said filter circuit includes a second multiplier circuit connected to and receiving outputs from said summing point amplifier and said ramp generator, and a second integrator connected to and receiving an output from said second multiplier.

3. The optical image correlator circuit as recited in claim 2 wherein said second integrator is connected to said summing point amplifier, said second integrator supplying an output therefrom to said amplifier as an input thereto.

4. The optical image correlator circuit as recited in claim 3 wherein said second integrator is connected to said first multiplier, said output of said second integrator being supplied to said first multiplier as an input thereto.

5. An optical image correlator circuit having a tracking filter, comprising:

an optical image correlator receiving an optical image input signal, converting said input signal to an electron stream and nutating said stream as it approaches a storage grid upon which a reference image is maintained as a distributed charge, said correlator producing an output signal indicative of the correlation between the input signal and the reference image;

deflection coils interposed within said correlator for nutating said electron stream;

a deflection coil control circuit, including a ramp generator, producing a ramp function voltage output, connected to and controlling said deflection coils;

an amplifier connected to and receiving the output signal from said correlator;

a first feedback circuit connected across said amplifier and comprising a first multiplier feeding an integrator, said first multiplier connected to and receiving inputs from said ramp generator and said amplifier; and a second feedback circuit interconnected between said first feedback circuit and an input of said amplifier and comprising a second multiplier feeding an integrator, said second multiplier connected to and receiving inputs from said first integrator and said ramp generator.

6. The optical image correlator circuit according to claim 5 wherein said amplifier is a summing point amplifier receiving further inputs from said first and second integrators.

* * * * *